United States Patent [19]

Higuchi et al.

[11] Patent Number: 4,682,789
[45] Date of Patent: Jul. 28, 1987

[54] SEAT BELT FORWARDING DEVICE

[75] Inventors: Kazuo Higuchi; Takayuki Sugama; Hisakazu Okuhara, all of Utsunomiya; Kiichi Sasaki, Wako, all of Japan

[73] Assignee: Honda Giken Kogyo Kabushiki Kaisha, Tokyo, Japan

[21] Appl. No.: 794,634

[22] Filed: Nov. 4, 1985

[30] Foreign Application Priority Data

Nov. 2, 1984 [JP] Japan ................ 59-231765

[51] Int. Cl.⁴ .......................................... B60R 22/02
[52] U.S. Cl. .................................. 280/801; 297/481
[58] Field of Search ................ 280/801, 802, 808; 297/481, 469

[56] References Cited

U.S. PATENT DOCUMENTS 4,231,591 11/1980 Scherenberg et al. ............. 297/481

FOREIGN PATENT DOCUMENTS 2415209 10/1975 Fed. Rep. of Germany ...... 280/802
2710754 9/1977 Fed. Rep. of Germany ...... 297/481
2396556 3/1979 France .............................. 297/481

Primary Examiner—John J. Love
Assistant Examiner—Karin L. Ferriter
Attorney, Agent, or Firm—Lyon & Lyon

[57] ABSTRACT

Disclosed is a seat belt forwarding device for facilitating the fastening of a seat belt by rotating a rotary arm in a forward direction, in conjunction with a walk-in type seat, comprising, a rotary unit for forwardly rotating the rotary arm in response to a closing action of a door and backwardly rotating the rotary arm in response to an opening action of the door and cam means for controlling the backwardly inclined position of the rotary arm in such a manner that the rotary arm may be positioned along a seat back when the seat back is in its upright position and substantially along a floor behind the seat when the seat back is in its forwardly inclined position. Thereby, when the seat back is inclined forwardly, the rotary arm will not obstruct the access to the rear seat, and, when the seat back is upright, the rotary arm aligns along the seat back, and the rotary arm will not impair the comfort of the rear seat.

1 Claim, 9 Drawing Figures

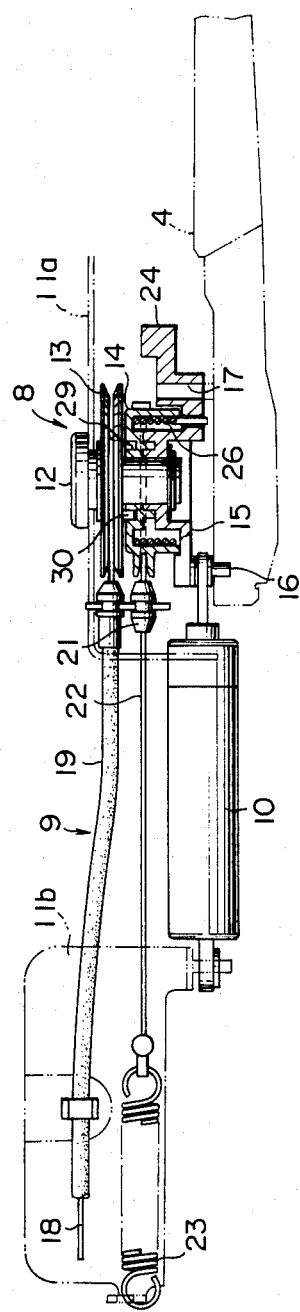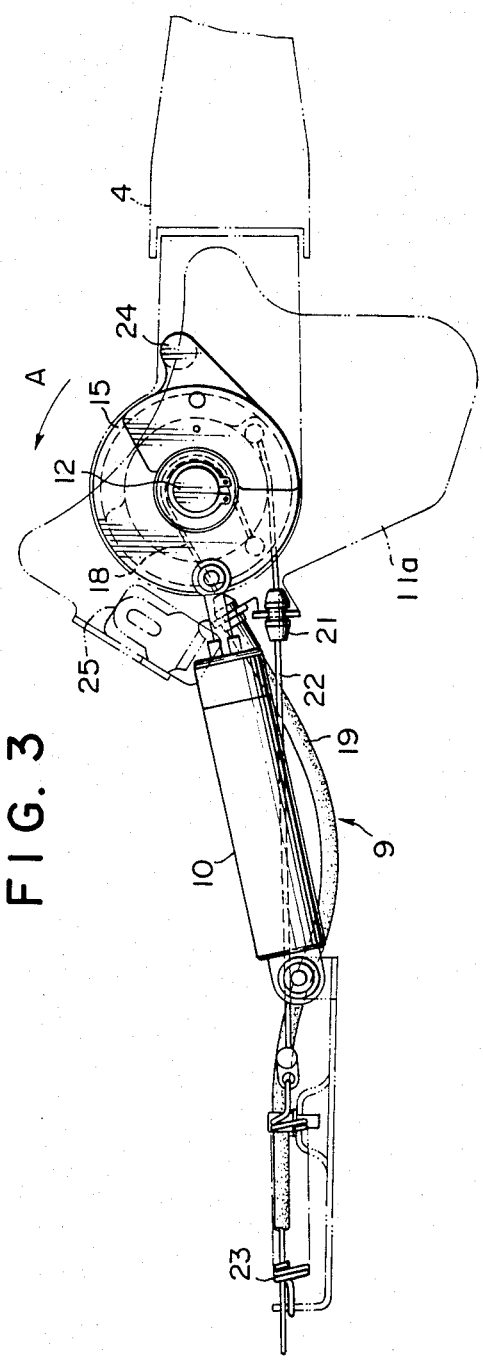

F I G. 4
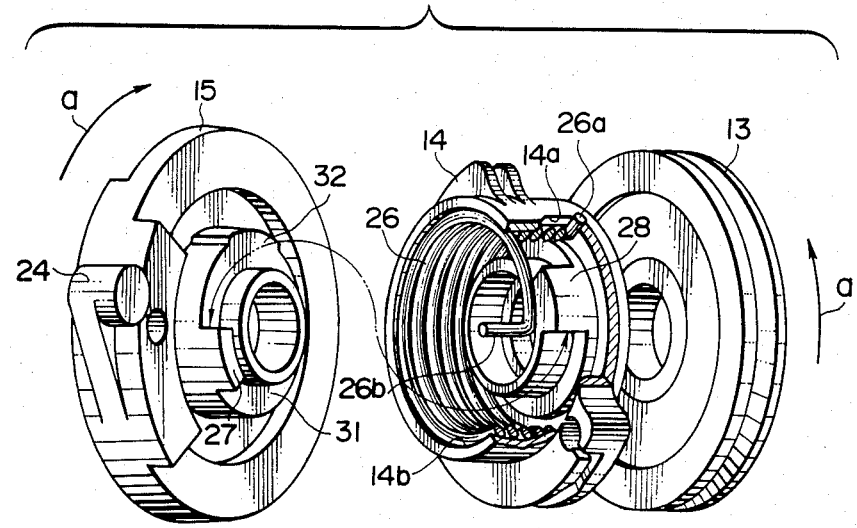
F I G. 5
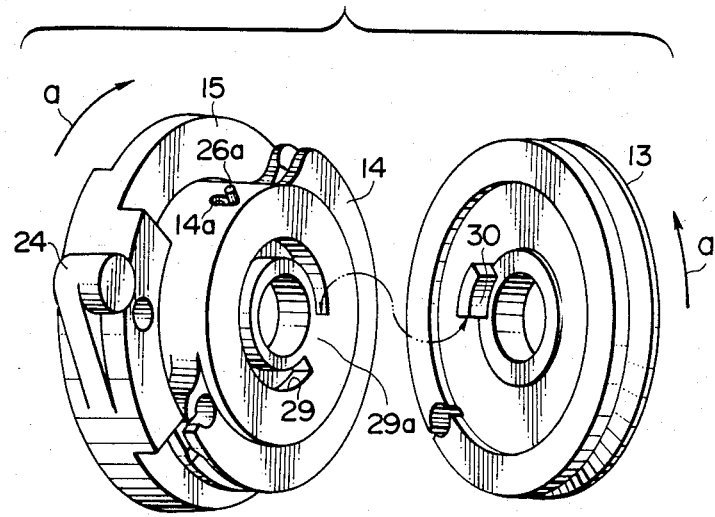

SEAT BELT FORWARDING DEVICE

This invention relates to a seat belt forwarding device (seat belt reacher device) for facilitating the fastening of a seat belt by rotating a rotary arm carrying an end of the seat belt in a forwardly direction, and in particular to such a seat belt forwarding device which is adapted for use with a walk-in type seat.

Although the necessity of wearing a seat belt while driving is widely recognized, it has not been entirely successful to encourage drivers and passengers to wear seat belts. Therefore, there have been various efforts to facilitate the use of a seat belt. For instance, a copending U.S. patent application Ser. No. 794,570, U.S. Pat. No. 4,650,215 assigned to the same Assignee discloses a seat belt forwarding system comprising a rotary arm carrying an end of a seat belt at its free end. The rotary arm is driven by a tension cable by way of a rotary unit comprising three transmitting members which are coaxially arranged and supported in a freely rotatable manner. By advantageous arrangement of the transmitting members, even when the rotary arm is obstructed of its motion, spring means advantageously absorb the resultant force and no excessive force will be produced in the rotary unit. The first spring means biases the second transmitting member in a backward direction while the second spring means is engaged between the second and the third transmitting members. The transmission of force between the transmitting members is achieved by projections provided in the opposing surfaces of the transmitting members, in addition to the transmission of force between the second and the third transmitting members by the second spring means.

In such a seat belt forwarding device, the rotary arm is positioned on the floor surface behind the seat when the door is open, but, when the space between the front seat and the rear seat is too small, as in the case of a two-door passenger car, the motion of the rotary arm is interfered by the rear seat and not only the comfort of the rear seat is impaired but also the appearance of the passenger compartment may be damaged. It is conceivable to reduce the total length of the rotary arm and/or to provide a space along each side end of the rear seat, but, in the former case, the usability of the seat belt will be impaired and, in the latter case, the comfort of the rear seat will be impaired. Also, it is conceivable to set the angle of the maximum backward rotation of the rotary arm substantially equal to the angle of the seat back, but, because the seat back of the front seat has to be inclined forwardly when a passenger is to get into the rear seat in the case of a walk-in seat, the access to the rear seat will be damaged.

In view of the shortcomings of the prior art, a primary object of this invention is to provide a seat belt forwarding device using a rotary arm to carry one end of a seat belt according to which, even when it is used with a walk-in type seat, the access to the rear seat and the comfort of the rear seat are not impaired.

Another object of this invention is to provide a seat belt forwarding device which is adapted for use with a walk-in type seat and is yet simple and reliable.

According to this invention, such an object is achieved by providing a seat belt forwarding device for facilitating the fastening of a seat belt by rotating a rotary arm carrying an end of the seat belt in a forward direction, in conjunction with a walk-in type seat, comprising, a rotary unit for forwardly rotating the rotary arm in response to a closing action of a door and backwardly rotating the rotary arm in response to an opening action of the door and cam means for controlling the backwardly inclined position of the rotary arm in such a manner that the rotary arm may be positioned along a seat back when the seat back is in its upright position and substantially along a floor behind the seat when the seat back is in its forwardly inclined position.

Since the front seat moves forwardly as the seat back of the front seat is inclined forwardly in such a walk-in type seat, the rotary arm inclines backwardly towards the floor surface behind the front seat and the access to the rear seat will not be impaired. When the seat back of the front seat is restored to the upright position, the rotary arm is positioned adjacent to the seat back and the comfort of the rear seat will not be impaired.

The present invention will now be shown and described in the following in terms of concrete embodiments thereof with reference to the appended drawings, in which:

FIG. 2 is a partly broken-away plan view showing an essential portion of the seat belt forwarding device of FIG. 1;

FIG. 3 is a side view of an essential portion of the same embodiment;

FIGS. 4 and 5 are exploded perspective views illustrating the relationships between the three transmitting member used in the above embodiment.

Figure 1:
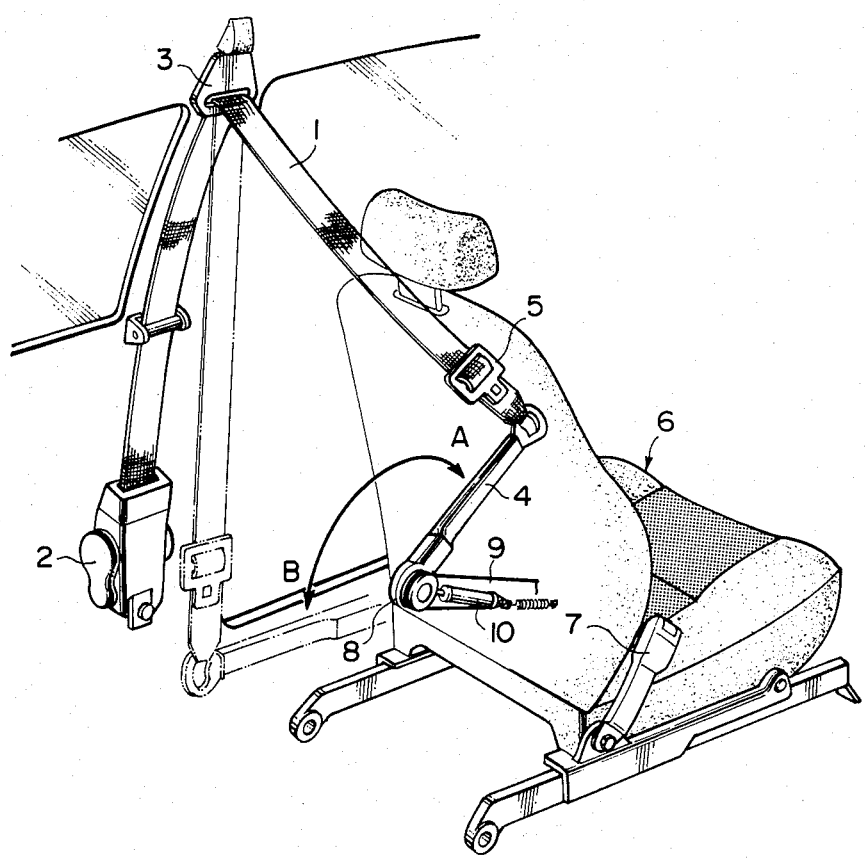
FIG. 1 is a perspective view showing an overall structure of a seat belt forwarding device of this invention.

FIG. 1 is a general perspective view of a seat belt forwarding device according to this invention. A seat belt 1 is attached to the free end of a rotary arm 4 after being taken out from a belt retractor 2 and passing through a through ring 3. When the door is open, the rotary arm 4 is in a backwardly inclined position as indicated by an arrow B and imaginary lines, and, as the door is closed, the rotary arm 4 rotates in a forwardly direction as indicated by an arrow A. A tongue plate 5 is attached to the seat belt 1 near its free end and, once the rotary arm 4 has rotated forward, a passenger seated in a seat 6 can readily engage the tongue plate 5 with a buckle 7 which is attached to the other side of the seat 6. Since the seat belt 1 will be located in a position which is suitable for the passenger to fasten the seat belt, the use of the seat belt is effectively encouraged without giving him any constraining impression.

It is possible to utilize drive sources of various types for driving the seat belt forwarding device, in particular its rotary arm, but, according to this embodiment, the force applied to the door to close it is transmitted to a rotary unit 8 which is connected to the rotary arm 4, by way of a control cable 9 whose one end is connected to a door checker provided in a door panel, as a pulling force of the control cable, and the rotary arm 4 is thus driven with the closing force applied to the door without using any other special drive source.

FIGS. 2 and 3 show the rotary unit 8 of FIG. 1 in greater detail. One end of an outer cable 19 of the control cable 9 is engaged to a fixed bracket 11a of a seat assembly and one end of an inner cable 18 passed through the outer cable 19 is wound around a first pulley 13 serving as a first transmitting member. The first pulley 13 is rotatably supported by a pivot shaft 12 which is fixedly secured to the fixed bracket 11a of the seat assembly. The pivot shaft 12 further supports a second pulley 14 serving as a second transmitting member adjacent to the first pulley 13, and a cable 22 wound around the second pulley 14 is connected to an end of a tension coil spring 23 at its free end by way of a cable guide 21 fixedly secured to the fixed bracket 11a. The other end of the tension coil spring 23 is engaged to a fixed bracket 11b and the tension coil spring 23 rotatively biases the second pulley 14 in one direction or in the direction corresponding to the backward rotation of the rotary arm 4 by way of the cable 22.

The pivot shaft 12 further supports a disc member 15 serving as a third transmitting member, in a freely rotatable manner, adjacent to the second pulley 14. A base end of the rotary arm 4 is fixedly secured to the disc member 15 by way of a mounting hole 17 and a pin 16 which engage with a pin (unnumbered) and a hole (unnumbered), respectively, provided in the base of the rotary arm 4. An end of a damper 10 for controlling the motion of the rotary arm 4 is connected to the pin 16. A stopper projection 24 is integrally formed in a part of the disc member 15 and determines the maximum extent of the forwardly rotation of the rotary arm 4 by cooperating with a stopper member 25 made of rubber and integrally attached to the fixed bracket 11a.

FIGS. 4 and 5 are exploded perspective views showing the relationships between the pulleys 13 and 14 and the disc member 15 in greater detail. As best shown in FIG. 4, the face of the second pulley 14 opposing the disc member 15 is provided with an annular depression 14b accommodating a torsion coil spring 26. An end 26a of the torsion coil spring 26 is engaged to a hole 14a provided in the second pulley 14 while the other end 26b of the torsion coil spring 26 is likewise engaged to a hole (not shown in the drawings) provided in the disc member 15. The mutually opposing surfaces of the disc member 15 and the second pulley 14 are provided with arcuate projections 27 and 28 which are concentrically disposed and extend over the angle of about 45 degrees, and by mutual engagement of the ends of these arcuate projections 27 and 28 the range of the relative rotation of the disc member 15 and the second pulley 14 is determined.

When a driving force is to be transmitted from the pulley 14 to the disc member 15 for forward rotation of the rotary arm 4, as indicated by an arrow a in FIG. 4, the force is transmitted between the disc member 15 and the pulley 14 by way of the torsion coil spring 26. When a driving force is to be transmitted between the pulley 14 and the disc member 15 for backwardly rotation of the rotary arm 4, the driving force is directly transmitted by direct engagement of the two arcuate projections 27 and 28.

As clearly shown in FIG. 5, the second pulley 14 and the first pulley 13 are provided with an annular groove 29 and an arcuate projection 30, respectively, in their mutually opposing surfaces, in a concentric manner relative to the central axial line along a same circumferential line. The annular groove 29 is provided over the range of about 315 degrees, thus defining an arcuate projection 29a extending over the angle of about 45 degrees, while the arcuate projection 30 is provided over the range of about 45 degrees. And the two pulleys 13 and 14 are combined in such a manner that the arcuate projection 30 is received by the annular groove 29.

As mentioned previously, the second pulley 14 is always biased by the tension coil spring 23 so as to backwardly rotate the rotary arm 4 and, when the first pulley 13 is rotated by the inner cable 18 which is pulled by the closing action of the door, the arcuate projection 30 engages an end of the annular groove 29 or the projection 29a and rotative driving force is directly transmitted from the first pulley 13 to the second pulley 14. However, if the door is opened with the rotary arm 4 held in its forwardly rotated state for any reason, the first pulley 13 can restore to a position corresponding to the open state of the door with the arcuate projection 30 traveling in the groove 29.

Figure 6:
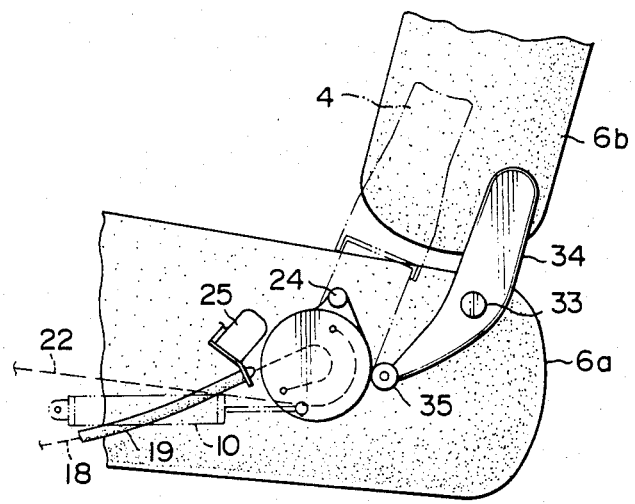
FIGS. 6 and 7 are schematic side views showing an embodiment of the structure for controlling the backward rotation of the rotary arm in the seat belt forwarding device according to this invention.
Figure 7:
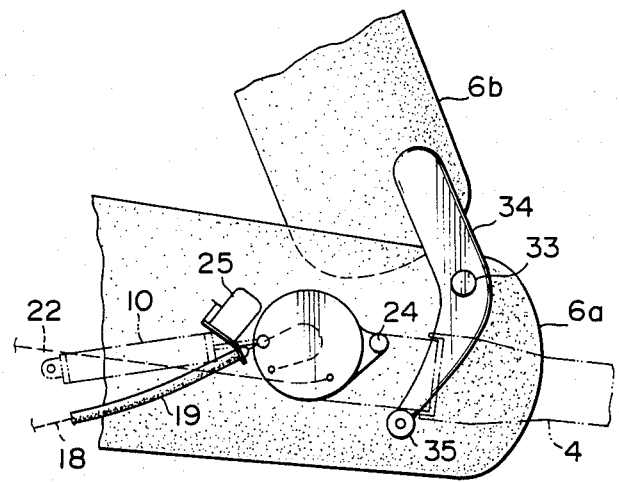
Figure 8:
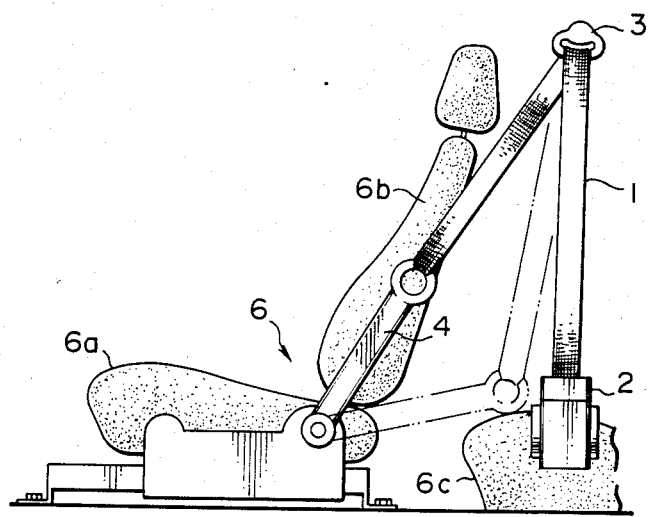
FIGS. 8 and 9 are schematic side views showing backwardly inclined positions of the rotary arm of the above mentioned embodiment in conjunction with a walk-in type seat.
Figure 9:
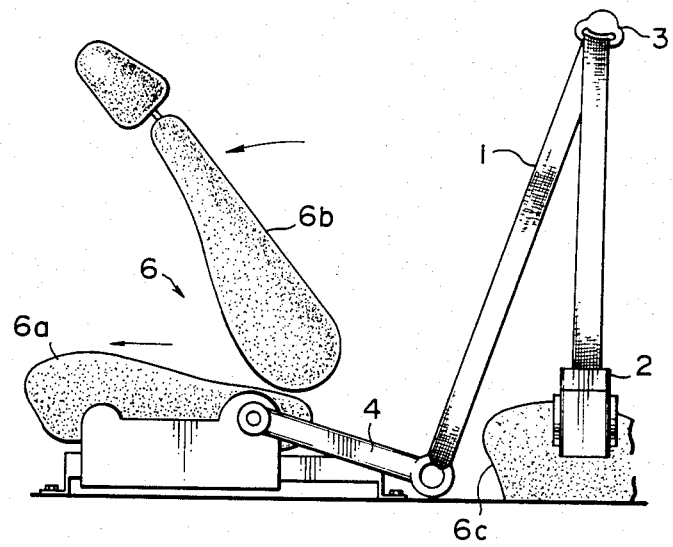

Now, according to this invention, the seat 6 is of a walk-in type in which a seat back 6b is adapted to incline forwardly, relative to a seat main body 6a, about a pivot shaft 33 by way of a reclining plate 34 as shown in FIGS. 6 and 7, and the seat 6 as a whole slides forwardly simultaneously with the forward rotation of the seat back 6b, as shown in FIGS. 8 and 9. The reclining plate 34 which hinges the seat back 6b is provided with a depending extension whose lower end is provided with a cam member 35. The cam member 35, for instance, may consist of a roller which is rotatably supported by a pin fixedly secured to the lower end of the reclining plate 34.

As shown in FIG. 6, when the seat back 6b is upright, the cam member 35 engages with the base end of the rotary arm 4 and limits the backward rotation of the rotary arm 4, thus preventing the rotary arm 4 from backwardly rotating beyond the position at which the rotary arm 4 aligns with the seat back 6b. However, when the seat back 6b is inclined forwardly as shown in FIG. 7, the cam member 35, along with the reclining plate 34, moves away from the base end of the rotary arm 4 and the rotary arm 4 can then incline backwardly up to the position at which the rotary arm 4 comes close to the floor surface.

Now the action of this embodiment is described in the following with reference mainly to FIGS. 3 and 4.

When the door is open, substantially no tension is acting upon the inner cable 18 and the rotary arm 4 assumes a backwardly inclined position as indicated by imaginary lines in FIGS. 1 through 3. When a passenger is seated and the door is closed, the inner cable 18 is pulled and the first pulley 13 is rotatively driven in a direction indicated by an arrow a in FIGS. 4 and 5 or to rotate the rotary arm 4 in a forwardly direction. Then, the arcuate projection 30 of the first pulley 13 engages with an end of the annular groove 29 of the second pulley 14 and drives the second pulley 14 in the direction indicated by arrow a against the spring force of the tension coil spring 23. At the same time, the second pulley 14 drives the disc member 15 in the direction a by way of the torsion coil spring 26 to rotate the rotary arm 4 in a forwardly direction. Thus, the passenger can reach for the tongue plate 5 located near the free end of the seat belt 1 with a natural posture and can readily engaged the tongue plate 5 with the buckle 7 for fastening the seat belt 1.

Since the driving force is transmitted between the second pulley 14 and the disc member 15 by way of the torsion coil spring 26, the speed of the forwardly rotation of the rotary arm 4 can be appropriately controlled by the damper 10 connected to the pin 16 of the disc member 15. And, when the rotary arm 4 is interfered of its motion by some object, the driving force tending to forwardly rotate the rotary arm 4 is absorbed by the torsion coil spring 26 and no excessive force will act upon the rotary unit 8.

When the tongue plate 5 is released from the buckle 7 with the door kept closed, the rotary arm 4 remains in its forwardly inclined position. When the door is opened in this state, the tension of the inner cable 18 is lost and the second pulley 14 rotates in the direction to backwardly rotate both the first pulley 13 and the rotary arm 4 by the spring force of the tension coil spring 23 by engagement of the projection 29a and the arcuate projection 30, and the engagement of the arcuate projections 27 and 28. Thereby, the rotary arm 4 is directly driven into its backwardly inclined position. If the rotary arm 4 can not rotate backwardly by being interfered by some object even though the door is opened, the arcuate projection 30 of the first pulley 13 travels backwardly in the groove 29 so that the first pulley 13 can rotate freely relative to the second pulley 14 and no excessive force will act upon the inner cable 18 while the rotary arm 4, the disc member 15 and the second pulley 14 are biased rotatively in backwardly direction by the tension coil spring 23. Once the object interfering with the rotary arm 4 is removed, the rotary arm 4 restores to the backwardly inclined position by the restoring force of the tension coil spring 23.

Although, in the above described embodiment, an action of a one-way clutch was obtained by the interaction between the arcuate projection 30 and the annular groove 29 of the first and the second pulleys 13 and 14, respectively, it is possible to use other known mechanisms And, the cable 22 and the tension coil spring 23 were used as a means for restoring the second pulley 14, but it is also possible to use other means.

Now, if the seat back 6b is inclined forwardly so that a passenger may get in and out of the rear seat in this state as shown in FIG. 9, the cam member 35, along with the reclining plate 34, moves away from the base end of the rotary arm 4 and the rotary arm 4 is rotated backwardly down to the floor surface behind the seat 6 under the biasing force of the tension coil spring 23 transmitted through the cable 22. In the case of a walk-in type seat, since the seat 6 slides forwardly as a whole following the forward rotation of the seat back 6b, the rotary arm 4 will not be an obstacle in getting into and out of the rear seat since the rotary arm 4 will rotate backwardly to the position adjacent to the floor surface behind the front seat as shown in FIG. 9, instead of engaging with the rear seat 6c as shown by imaginary lines in FIG. 8, whereby the access to the rear seat will be improved.

When the seat back 6b is restored to the upright state, since the rotary arm 4 is forced to the position adjacent to the seat back 6b by the cam member 35, the rotary arm 4 will not be engaged to the rear seat 6c as shown by the imaginary lines in FIG. 8 and the comfort of the rear seat will not be impaired.

Although the backward rotation of the rotary arm 4 was controlled by the interaction between the cam member 35 provided in the reclining plate 34 and the base end of the rotary arm 4, it is possible to achieve the same object by using other means, such as a cable, a link, a lever and so on.

Thus, according to this embodiment, since the structure is simple, its manufacturing cost is low and its reliability is high. And, since the spring means can absorb driving force even when the door is opened and closed while the rotary arm is constrained, excessive force will not act upon any part of the system and its durability is assured.

In particular, when this invention is applied to a walk-in type seat, the access to the rear seat and the comfort of the rear seat are both favorable. Therefore, the seat belt forwarding device of this invention is highly practical and can effectively encourage the use of a seat belt.

Although the present invention has been shown and described with reference to the preferred embodiment thereof, it should not be considered as limited thereby. Various possible modifications and alterations could be conceived of by one skilled in the art to any particular embodiment, without departing from the scope of the invention.

What we claim is:

1. A seat belt forwarding device for facilitating the fastening of a seat belt by rotating a rotary arm carrying an end of the seat belt in a forward direction, in conjunction with a walk-in type seat, comprising:

a rotary unit for forwardly rotating the rotary arm in response to a closing action of a door and backwardly rotating the rotary arm in response to an opening action of the door; and said rotary unit controlling the backwardly inclined position of the rotary arm in such a manner that the rotary arm may be positioned along a seat back when the seat back is in its upright position and substantially along a floor behind the seat when the seat back is in its forwardly inclined position, wherein said rotary unit comprises a cam means provided in a lower portion of the seat back for cooperation wit a base end of the rotary arm, wherein said cam members comprises a roller supported by a lower end of a reclining plate serving as a hinge member between a main body of the seat and the seat back.

* * * * *